US008848688B1

(12) United States Patent
Wurtenberger et al.

(10) Patent No.: US 8,848,688 B1
(45) Date of Patent: Sep. 30, 2014

(54) SYSTEM AND METHOD FOR USING A HANDOFF THRESHOLD ASSOCIATED WITH A SLOT CYCLE INDEX TO DETERMINE WHETHER TO PERFORM AN ACCESS TERMINAL HANDOFF

(75) Inventors: Andrew M. Wurtenberger, Olathe, KS (US); Rajveen Narendran, Olathe, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1196 days.

(21) Appl. No.: 12/245,168

(22) Filed: Oct. 3, 2008

(51) Int. Cl.
*H04W 4/00* (2009.01)

(52) U.S. Cl.
USPC .......................................................... 370/351

(58) Field of Classification Search
USPC .......................................... 370/331; 455/436
See application file for complete search history.

(56) References Cited

U.S. PATENT DOCUMENTS

| 5,995,836 | A | 11/1999 | Wijk et al. | |
|---|---|---|---|---|
| 6,889,067 | B2 | 5/2005 | Willey | |
| 7,047,005 | B2 * | 5/2006 | Kinnavy | 455/434 |
| 7,089,007 | B2 * | 8/2006 | Wakuta et al. | 455/436 |
| 7,123,601 | B2 * | 10/2006 | He et al. | 370/335 |
| 7,130,626 | B2 | 10/2006 | Bender et al. | |
| 7,215,956 | B2 * | 5/2007 | Liu et al. | 455/434 |
| 7,302,261 | B2 * | 11/2007 | Rajkotia et al. | 455/434 |
| 7,480,510 | B1 * | 1/2009 | Woleben et al. | 455/453 |
| 7,881,240 | B1 * | 2/2011 | Wurtenberger et al. | 370/311 |
| 7,983,696 | B1 * | 7/2011 | Manghat et al. | 455/458 |
| 8,064,911 | B2 * | 11/2011 | Kim et al. | 455/438 |
| 8,254,858 | B2 * | 8/2012 | Tu et al. | 455/127.5 |
| 2002/0061749 | A1 * | 5/2002 | Hunzinger | 455/436 |
| 2002/0082012 | A1 * | 6/2002 | Wang et al. | 455/435 |
| 2005/0043024 | A1 * | 2/2005 | Shiga | 455/428 |
| 2005/0090259 | A1 | 4/2005 | Jain et al. | |
| 2005/0221828 | A1 * | 10/2005 | Wakuta et al. | 455/437 |
| 2006/0009220 | A1 | 1/2006 | Kiyomoto et al. | |
| 2006/0009253 | A1 * | 1/2006 | Nielsen et al. | 455/552.1 |
| 2006/0109820 | A1 * | 5/2006 | Miyata | 370/332 |

(Continued)

FOREIGN PATENT DOCUMENTS

WO   WO 2007/081994 A1   7/2007

OTHER PUBLICATIONS

Agilent Technologies, 8960 1xEV-DO Online User's Guide, E1966A, E1976A, E6706B, UATI Color Code, Nov. 10, 2006.

(Continued)

*Primary Examiner* — Brandon Renner
*Assistant Examiner* — Faisal Choudhury

(57) ABSTRACT

A method and system for using a handoff threshold associated with a slot cycle index to determine whether to perform access terminal handoff from a current pilot signal to a target pilot signal. The determination may be conditioned on whether the current pilot signal and target pilot signal are transmitted from base stations within a common subnet. If the base stations are within a common subnet, handoff of the access terminal is based on a default handoff threshold. On the other hand, if the base stations are not within a common subnet, then the determination of whether to perform access terminal handoff from a current pilot signal to a target pilot signal may be made based on the handoff threshold associated with the slot cycle index. As a result, ping-ponging of the access terminal from one subnet to another may be reduced or prevented.

22 Claims, 8 Drawing Sheets

(56) References Cited

U.S. PATENT DOCUMENTS

| | | | |
|---|---|---|---|
| 2006/0120355 A1* | 6/2006 | Zreiq et al. ............... 370/352 |
| 2006/0246903 A1* | 11/2006 | Kong et al. ............... 455/437 |
| 2006/0270441 A1* | 11/2006 | Miyata ............... 455/522 |
| 2006/0291420 A1 | 12/2006 | Ng |
| 2007/0002799 A1* | 1/2007 | Hunzinger ............... 370/331 |
| 2007/0058587 A1 | 3/2007 | Han et al. |
| 2007/0077928 A1* | 4/2007 | Kim et al. ............... 455/436 |
| 2007/0160008 A1* | 7/2007 | Burgess ............... 370/331 |
| 2007/0242648 A1 | 10/2007 | Garg et al. |
| 2008/0089259 A1 | 4/2008 | Yang et al. |
| 2008/0144753 A1* | 6/2008 | Saed et al. ............... 375/347 |
| 2008/0205327 A1 | 8/2008 | Tu |
| 2008/0220784 A1* | 9/2008 | Somasundaram et al. .... 455/437 |
| 2009/0075647 A1* | 3/2009 | Lindoff et al. ............... 455/424 |
| 2010/0015979 A1* | 1/2010 | Kono ............... 455/436 |
| 2010/0046477 A1* | 2/2010 | Marin et al. ............... 370/332 |
| 2010/0056157 A1* | 3/2010 | Verona et al. ............... 455/438 |
| 2010/0255845 A1* | 10/2010 | Kitaji ............... 455/436 |
| 2010/0291930 A1* | 11/2010 | Xie et al. ............... 455/436 |

OTHER PUBLICATIONS

Chauhan, Rahul, What does the mobile do when its idle?, Aug. 2001, downloaded from the World Wide Web at http://www.geocities.com/rahulscdmapage/Idle.html?200823 on Sep. 23, 2008.

3rd Generation Partnership Project 2 "3GPP2", cdma2000 High Rate Packet Data Air Interface Specification, Jul. 2005, table of contents and pp. 8-29 to 8-125.

* cited by examiner

| Neighbor PN Code / BS | Neighbor Subnet | |
|---|---|---|
| PN B / BS 108 | 0 | ~506 |
| PN C / BS 210 | 1 | ~510 |
| PN D / BS 212 | 1 | ~512 |

502 — 504 — (506 at top row)

318

SYSTEM AND METHOD FOR USING A HANDOFF THRESHOLD ASSOCIATED WITH A SLOT CYCLE INDEX TO DETERMINE WHETHER TO PERFORM AN ACCESS TERMINAL HANDOFF

BACKGROUND

Many people use access terminals, such as cell phones and personal digital assistants (PDAs), to communicate with radio access networks, such as cellular wireless networks. These access terminals and access networks typically communicate with each other over a radio frequency (RF) air interface according to a wireless protocol such as Evolution Data Optimized (Ev-DO), perhaps in conformance with one or more industry specifications such as IS-856, Release 0 and IS-856, Revision A. Another protocol that may be used is known as Code Division Multiple Access (CDMA), perhaps in conformance with one or more industry specifications such as IS-2000. Other protocols may be used as well, such as Global System for Mobile Communications (GSM), Time Division Multiple Access (TDMA), and/or any others.

Access networks typically provide services such as voice, Short Message Service (SMS) messaging, and packet-data communication, among others, and typically include a plurality of base stations, each of which provide one or more coverage areas, such as cells and sectors (i.e., individual areas of a cell that allow the cell to carry more calls). When an access terminal is positioned in one of these coverage areas, it can communicate over the air interface with the base station, and in turn over one or more circuit-switched and/or packet-switched signaling and/or transport networks to which the base station provides access.

Access terminals and access networks may conduct communication sessions (e.g. voice calls and data sessions) over a pair of frequencies known as carriers, with a base station of an access network transmitting to an access terminal on one of the frequencies, and the access terminal transmitting to the base station on the other. This is known as frequency division duplex (FDD). A base-station-to-access-terminal link is known as the forward link, while a access-terminal-to-base-station link is known as the reverse link. Each of the base stations may transmit one or more pilot signals to the access terminals via the forward link. The access terminals may use the pilot signals to determine which base stations and/or sectors to use to conduct the communication sessions.

OVERVIEW

As noted above, access terminals may use pilot signals to determine which base stations and/or sectors to use to conduct communication sessions. Unfortunately, under some circumstances, such as when an access terminal is in motion near the boundaries of the coverage areas provided by two base stations, the access terminal may repeatedly handoff from a first of the two base stations to second of the two base stations and back to the first base station. This repetition of handoffs, if occurring over a short period of time, may be referred to as ping-ponging. Ping-ponging may be undesirable to a user of the access terminal and/or to a service provider that operates the base stations, especially if the two base stations are each associated with a different set of base stations (e.g., two different subnets). For instance, handoff of an access terminal between base stations in different subnets may require transferring more data between radio network controllers that control the base stations than if the access terminal is handed off between base stations within the same subnet. Disclosed herein are systems and methods for using a handoff threshold associated with a slot cycle index to determine whether to perform an access terminal handoff. These systems and methods may reduce or prevent ping-ponging.

In one respect, an exemplary embodiment may take the form of a method comprising: (i) maintaining correlation data that associates each slot cycle index of a plurality of slot cycle indices with a respective handoff threshold, (ii) an access terminal operating at a particular slot cycle index, (iii) querying the correlation data to determine a handoff threshold associated with the particular slot cycle index, and (iv) the access terminal making a first determination of whether a signal strength of a target pilot signal received at the access terminal exceeds a signal strength of a current pilot signal received at the access terminal by the determined handoff threshold. If the access terminal determines that the signal strength of the target pilot signal exceeds the signal strength of the current pilot signal by the determined handoff threshold, the access terminal thereafter hands off to the target pilot signal. On the other hand, if the access terminal determines that the signal strength of the target pilot signal does not exceed the signal strength of the current pilot signal by the determined handoff threshold, then the access terminal thereafter idles on the current pilot signal.

In another respect, an exemplary embodiment may take the form of an access terminal comprising: (i) a processor, (ii) a receiver to receive a current pilot signal and a target pilot signal, and (iii) data storage containing computer-readable program instructions that are executable by the processor and correlation data that associates each slot cycle index of a plurality of slot cycle indices with a respective handoff threshold. The computer-readable program instructions include instructions that (i) cause the access terminal to operate at a particular slot cycle index, (ii) cause the access terminal to query the correlation data to determine a handoff threshold associated with the particular slot cycle index, and (iii) cause the access terminal to make a first determination of whether a signal strength of the target pilot signal exceeds a signal strength of the current pilot signal by the determined handoff threshold. If the access terminal determines that the signal strength of the target pilot signal exceeds the signal strength of the current pilot signal by the determined handoff threshold, the access terminal thereafter hands off to the target pilot signal. On the other hand, if the access terminal determines that the signal strength of the target pilot signal does not exceed the signal strength of the current pilot signal by the determined handoff threshold, the access terminal thereafter idles on the current pilot signal.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

Figure 1:
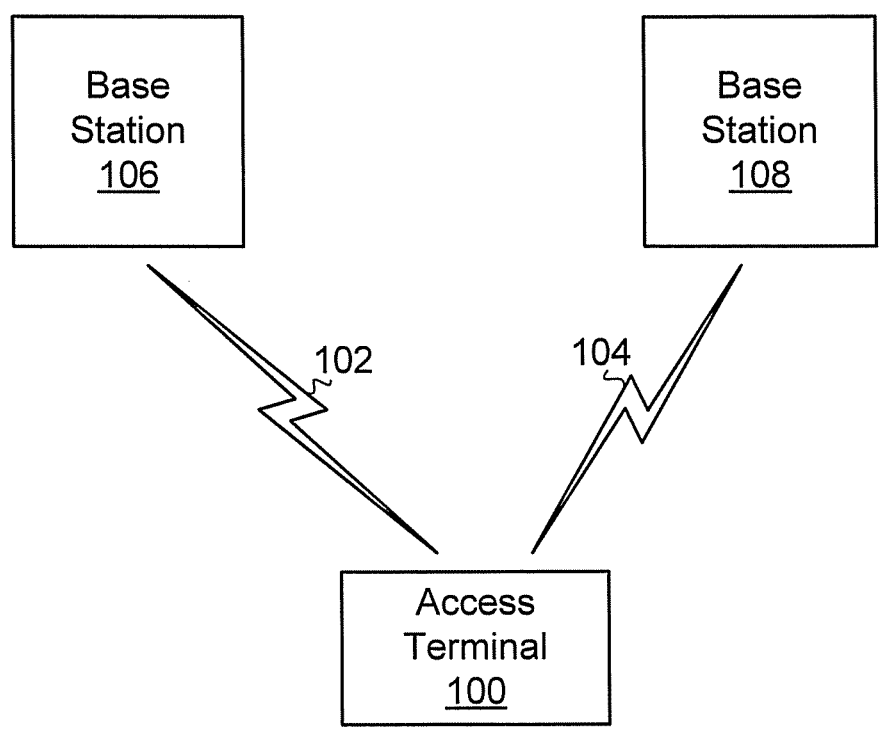
FIG. 1 depicts an arrangement of devices for carrying out the exemplary embodiments.

FIG. 1 depicts an arrangement of devices for carrying out exemplary embodiments described herein. In particular, the figure depicts an access terminal 100, pilot signals 102, 104 and base stations 106, 108. Pilot signals 102, 104 are transmitted by base stations 106, 108, respectively, and may be received by access terminal 100. Each pilot signal received by access terminal 100 may contain a respective pseudo-noise (PN) code to distinguish the pilot signals.

As shown in FIG. 1, both base stations are depicted as transmitting only one pilot signal. A person skilled in the art, however, will understand that one or both of the base stations may transmit more than one pilot signal and that access terminal 100 may receive a number of pilot signals greater than or less than two pilot signals. In the case in which a base station transmits multiple pilot signals, each of the multiple pilot signals may be associated with a respective sector provided by the base station. Additionally, a given pilot signal (e.g., pilot signal 102) transmitted from a given base station (e.g., base station 106) may be a current pilot signal for access terminal 100 while the given base station is serving access terminal 100. One or more other pilot signals (e.g., pilot signal 104) may each be a target pilot signal for access terminal 100.

Access terminal 100 may operate in various modes. For example, access terminal 100 may operate in a traffic channel mode in which access terminal 100 engages in a traffic channel communication session (e.g., a voice call or a data session) via base station 106. As another example, access terminal 100 may operate in an idle mode in which access terminal 100 does not engage in a traffic channel communication session and in which access terminal 100 idles on the current pilot signal. Other examples of the modes in which access terminal 100 may operate are also possible.

Access terminal 100 may operate at a particular slot cycle index. The slot cycle index may indicate how often access terminal 100 monitors overhead messages transmitted from a base station that is serving access terminal 100. Monitoring the overhead messages may include monitoring overhead messages that contain the same PN code that is contained in the current pilot signal and that are transmitted over a control channel or a paging channel. Examples of the overhead messages include access parameter messages, system parameter messages, neighbor list messages, channel list messages, and user zone identification messages. Other examples of the overhead messages are also possible.

In accordance with an exemplary embodiment, access terminal 100 may maintain correlation data that associates each slot cycle index of a plurality of slot cycle indices with a respective handoff threshold, and query the correlation data so as to determine a handoff threshold that is associated with a particular slot cycle index at which access terminal is operating. Access terminal 100 makes a determination of whether a signal strength of a received target pilot signal exceeds a signal strength of a received current pilot signal by the determined handoff threshold. If access terminal 100 determines that the signal strength of the target pilot signal does not exceed the signal strength of the current pilot signal by the determined handoff threshold, then access terminal 100 thereafter idles on the current pilot signal. On the other hand, if access terminal 100 determines that the signal strength of the target pilot signal exceeds the signal strength of the current pilot signal by the determined handoff threshold, access terminal 100 thereafter hands off to the target pilot signal. After handing off to the target pilot signal, the target pilot signal becomes the current pilot signal (i.e., a new current pilot signal), the previous current pilot signal may become a target pilot signal, and access terminal 100 begins idling on the current pilot signal (i.e., the new current pilot signal). In either case, while idling on the current pilot signal, access terminal 100 may monitor overhead messages containing the PN code that is also contained in the current pilot signal.

2. Exemplary Architecture

Figure 2:
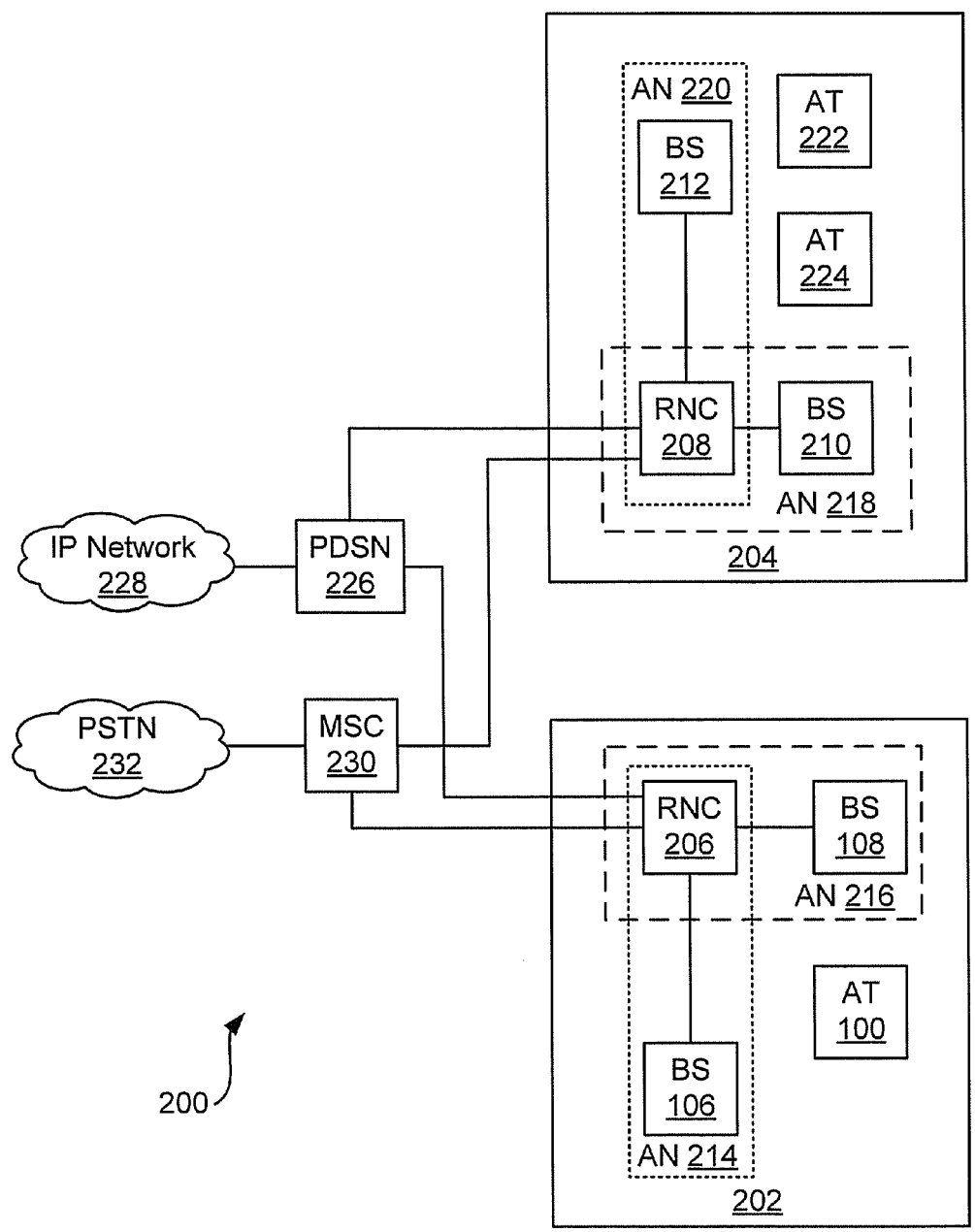
FIG. 2 is a block diagram of a network in which an exemplary embodiment may be implemented.

Next, FIG. 2 depicts an exemplary network 200 in which the exemplary embodiments may operate and/or be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

Network 200 includes subnets 202, 204. Subnets 202, 204 each comprise a radio network controller (RNC) (e.g., a base station controller) 206, 208, respectively, and, for each of the RNCs, a logical set of base stations comprising one or more base stations. For example, subnet 202 includes a logical group of base stations including base stations 106, 108 and subnet 204 includes a logical group of base stations including base stations 210, 212. In an alternative embodiment, either or both of subnets 202, 204 may include multiple RNCs and, for each of the RNCs, a logical set of base stations. Typically, an RNC manages each base station of a given logical set of base stations. Each base station may belong to a given logical set of base stations due to its proximity to an RNC, due to a limitation in how many base stations an RNC may manage, and/or for some other reason.

Pilot signals may be arranged in various configurations known to persons having ordinary skill in the art. In one such configuration, each pilot signal transmitted from a given subnet may contain a PN code containing several binary digits. However, for simplicity of this description, base station 106 transmits a pilot signal containing a PN code "A," base station 108 transmits a pilot signal containing a PN code "B," base station 210 transmits a pilot signal containing a PN code "C," and base station 212 transmits a pilot signal containing a PN code "D."

A plurality of access terminals 100, 222, 224 may use network 200 to carry out communication sessions. A person having ordinary skill in the art will understand that other access terminals may also use network 200 to carry out communication sessions and that network 200 may include a number of subnets greater than or less than two subnets.

RNCs 206, 208 connect to a packet data serving node (PDSN) 226 and, in turn, to an Internet Protocol (IP) network 228. PDSN 226 is operable to manage the establishment, maintenance, and termination of point-to-point (PPP) data sessions for access terminals 100, 222, 224. IP network 228 may include and/or provide access to the Internet. In an alternative embodiment, RNCs 206, 208 may connect to IP network 228 via separate PDSNs.

RNCs 206, 208 also connect to a mobile switching center (MSC) 230 and, in turn, to a public switched telephone network (PSTN) 232. MSC 230 is operable as a switch for voice calls and other communications to be carried out between access terminals 100, 222, 224 and devices (e.g., plain old telephone system (POTS) telephones) connected to PSTN 232.

Each base station and an RNC may operate in cooperation as a radio access network or more simply an access network. In this regard, subnet 202 includes an access network 214 comprising RNC 206 and base station 106, and an access network 216 comprising RNC 206 and base station 108. Similarly, subnet 204 includes an access network 218 comprising RNC 208 and base station 210, and an access network 220 comprising RNC 208 and base station 212.

Figure 3:
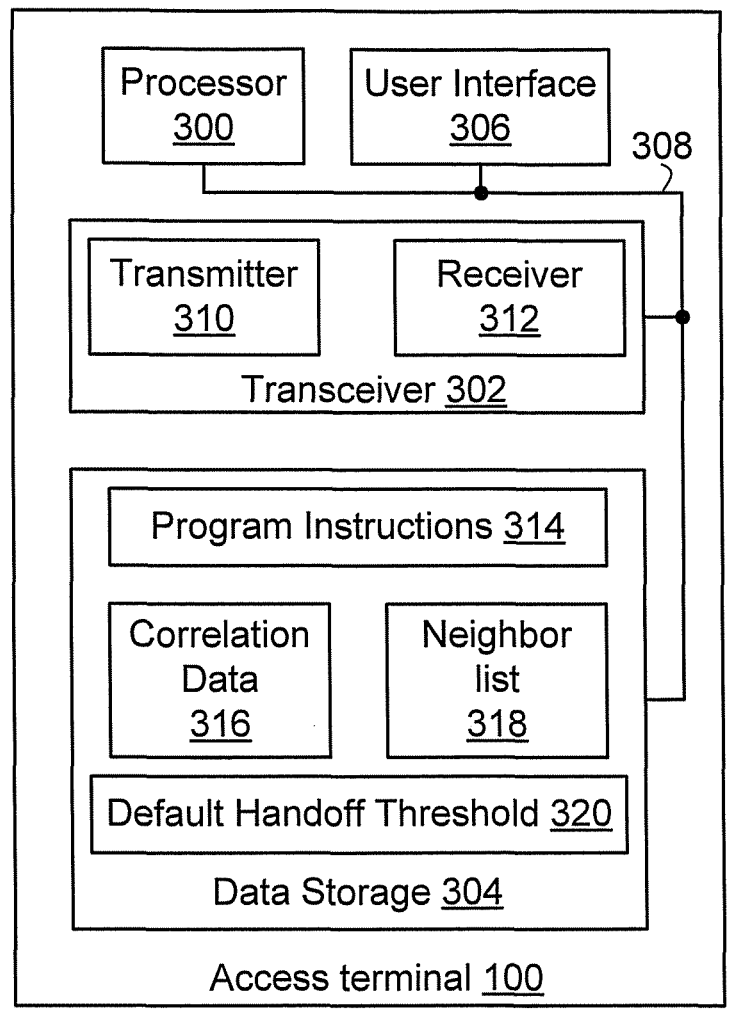
FIG. 3 is a block diagram of an exemplary access terminal.

Next, FIG. 3 is a block diagram depicting details of access terminal 100. Access terminal 100 includes a processor 300, a transceiver 302, data storage 304, and a user interface 306, all linked together via a system bus, network, or other connection mechanism 308. Access terminals 222, 224 may be arranged in a configuration similar to access terminal 100.

Processor 300 may comprise one or more general purpose processors (e.g., INTEL microprocessors) and/or one or more special purpose processors (e.g., digital signal processors). Processor 300 may execute computer-readable program instructions 314 so as to carry out various functions described in this description and/or to cause transceiver 302, data storage 304, and user interface 306 individually or a combination of transceiver 302, data storage 304, and user interface 306 to carry out various functions described in this description.

Transceiver 302 includes a transmitter 310 and a receiver 312. Transceiver 302 may comprise an integrated package (e.g., a chipset) that includes transmitter 310 and receiver 312. Alternatively, transmitter 310 and receiver 312 may be separate packages. Transceiver 302 may also comprise one or more antennas, such as an antenna used by transmitter 310 and receiver 312 or a separate antenna for use by transmitter 310 and a separate antenna for use by receiver 312.

Transmitter 310 is operable to wirelessly transmit communications via the reverse-link of a wireless air interface. The reverse-link communications may include reverse access channel communications to initiate communications with an access network or to respond to a message directed to access terminal 100. Additionally or alternatively, the reverse-link communications may include reverse traffic channel communications such as data channel communications of a voice call or data session. Other examples of the reverse-link communications are also possible.

Receiver 312 is operable to wirelessly receive communications via the forward link of a wireless air interface. As an example, receiver 312 may receive pilot signals 102, 104 from base stations 106, 108, respectively. As another example, receiver 312 may receive a neighbor list from a base station that is currently serving access terminal 100. Upon receiving the neighbor list, receiver 312 may provide the list to processor 300 and/or data storage 304 for subsequent storage as neighbor list 318. As another example, receiver 312 may receive forward-link traffic channel communications of a voice call or data session. Other examples of the forward-link communications are also possible.

Data storage 304 comprises a computer-readable storage medium readable by processor 300. The computer-readable storage medium may comprise volatile and/or non-volatile storage components, such as optical, magnetic, organic or other memory or disc storage, which can be integrated in whole or in part with processor 300. Data storage 304 may contain computer-readable program instructions 314, correlation data 316, a neighbor list 318, and a default handoff threshold 320. Data storage 304 may contain other data in addition to the data illustrated in FIG. 3. Examples of data that may be contained at data storage 304 are provided below.

Program instructions 314 may include program instructions that cause access terminal 100 to operate at a particular slot cycle index (e.g., 8 (2.56 seconds)) and to query correlation data 316 so as to determine a handoff threshold associated with the particular slot cycle index. As an example, the slot cycle index may be a whole number that corresponds to a given time (e.g., 2.56 seconds). As another example, the slot cycle index may be a number (e.g., 2.56) that represents an amount of time (e.g., 2.56 seconds) of a slot cycle.

Program instructions 314 may include program instructions that cause access terminal 100 to determine, for a given period of time, the energy of each pilot signal received at receiver 312 and the total energy received at receiver 312. These program instructions may cause access terminal 100 to determine a signal strength of each pilot signal received at access terminal 100 by determining a ratio of received energy of the pilot signal and the total received energy. The given period of time may, for example, be the amount of time required for the processor 300 to sample the energy level of the pilot signals and the total received energy.

Program instructions 314 may include program instructions that cause access terminal 100 to make a determination of whether a signal strength of a target pilot signal received at receiver 312 exceeds a signal strength of a current pilot signal received at receiver 312 by a given handoff threshold (e.g., the handoff threshold determined by access terminal 100). For purposes of this description, these program instructions are referred to as "first determination instructions." Execution of the first determination instructions may be conditioned on whether the target pilot signal and the current pilot signal are received from a base station or base stations of a common subnet. For instance, if access terminal 100 determines that the target pilot signal and the current pilot signal are received from a base station or base stations of a common subnet, then processor 300 may responsively execute the first determination instructions.

Program instructions 314 may include instructions that cause access terminal 100 to hand off to the target pilot signal. Execution of these program instructions may be conditioned, for example, on access terminal 100 determining that the signal strength of the target pilot signal exceeds the signal strength of the current pilot signal by the determined handoff threshold.

Program instructions 314 may include instructions that cause access terminal to idle on the current pilot signal. Execution of these program instructions may be conditioned, for example, on access terminal 100 determining that the signal strength of the target pilot signal does not exceed the signal strength of the current pilot signal by the determined handoff threshold.

Program instructions 314 may include program instructions that cause access terminal 100 to make a determination of whether the target pilot signal is received from a base station within a first subnet (e.g., subnet 202) or from a base station that is not within the first subnet. For purposes of this description, these program instructions are referred to as "second determination instructions." Execution of the second determination instructions may cause access terminal 100 to query neighbor list 318 so as to determine a parameter associated with the PN code contained in the received target pilot signal. This parameter may identify whether the base station is within the first subnet.

Program instructions 314 may include program instructions that cause access terminal 100 to make a determination of whether the signal strength of the target pilot signal exceeds the signal strength of the current pilot signal by default handoff threshold 320. For purposes of this description, these program instructions are referred to as "third determination instructions." Execution of the third determination instructions may occur in response to access terminal 100 determining that the target pilot signal is received from a base station that is within the first subnet.

Program instructions 314 may include program instructions whose execution is conditioned on the determination made by executing the third determination instructions. For example, execution of the program instructions that cause access terminal 100 to hand off to the target pilot signal may be conditioned on access terminal 100 determining that the signal strength of the target pilot signal exceeds the signal strength of the current pilot signal by the default handoff threshold 320. As another example, execution of the program instructions that cause access terminal 100 to idle on the current pilot signal may be conditioned on access terminal 100 determining that the signal strength of the target pilot signal does not exceed the signal strength of the current pilot signal by the default threshold 320.

Figure 4:
FIG. 4 is a table depicting exemplary correlation data.

Correlation data 316 associates each slot cycle index of a plurality of slot cycle indices with a respective handoff threshold. FIG. 4 depicts an example of correlation data 316. In FIG. 4, rows 406, 408, 410, 412, 414 of column 400 identify exemplary slot cycle indices, whereas these same rows in column 402 identify exemplary handoff thresholds. The slot cycle index of any row shown in FIG. 4 is associated with the handoff threshold in that same row. As shown in FIG. 4, each slot cycle index is associated with a different handoff threshold. Alternatively, two or more slot cycle indices may be associated with a common handoff threshold, so long as at least one other slot cycle index is associated with a handoff threshold different than the common handoff threshold.

Program instructions 314 may contain program instructions that cause correlation data 316 to be modified. Execution of these program instructions may be executed in response to access terminal 100 receiving from a base station serving access terminal 100 a message containing data to change at least one slot cycle index or handoff threshold in correlation data 316. Alternatively, execution of these program instructions may be executed in response to access terminal 100 receiving the data to change at least one slot cycle index or handoff threshold via user interface 306.

Neighbor list 318 contains a list of PN codes. Each of the listed PN codes may be associated with a respective sector and/or cell that is a neighbor to a sector and/or a cell in which access terminal 100 is operating. In this regard, a particular sector may be a neighbor sector to a given sector/cell if the coverage area provided by that particular sector is near and/or overlaps with the coverage area provided by the given sector/cell. Similarly, a particular cell may be a neighbor cell to a given sector/cell if the coverage area provided by that particular cell is near and/or overlaps with the coverage area provided by the given sector/cell. Network list 318 also includes, for each of the listed PN codes, a parameter that indicates whether the neighboring sector associated with that PN code is a sector that transmits a target pilot signal from a base station within the subnet including the base station that transmitted the current pilot signal. For purposes of this description, this parameter is referred to as a neighbor subnet parameter.

Figure 5:
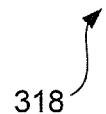
FIG. 5 is a table depicting an exemplary network list.

FIG. 5 depicts an example of neighbor list 318. In FIG. 5, rows 508, 510, 512 of column 502 identify exemplary PN codes B, C, D, and the base station that transmits these PN codes, whereas these same rows in column 504 identify a parameter that indicates whether the base station of that row is within the same subnet that transmits the current pilot signal or a neighboring subnet. In this case, a parameter "0" indicates that the subnet is not a neighbor subnet and a parameter "1" indicates that the subnet is a neighbor subnet. In another case, a "1" and/or some other character(s) may indicate that the subnet is not a neighbor subnet, and a parameter "0" and/or some other character(s) may indicate that the subnet is a neighbor subnet. In an alternative arrangement, neighbor list 318 may include greater than or less than three PN codes and their associated neighbor subnet parameters.

Neighbor list 318 may be periodically modified. For example, neighbor list 318 may be modified when access terminal 100 hands off to a target pilot signal from a subnet that is different than the subnet from which a current pilot signal has been transmitted. As another example, neighbor list 318 may be modified as access terminal 100 is moved from one location of a coverage area to another location within the coverage area. In accordance with these examples, program instructions 314 may include program instructions that cause access terminal 100 to modify neighbor list 318 in response to access terminal 100 receiving from a base station serving access terminal 100 a neighbor list message including at least one PN code and/or a neighbor subnet parameter that differs from the data being maintained as neighbor list 318 at the time the neighbor list message is received.

Default handoff threshold 320 may contain a handoff threshold that is stored at data storage 304 at the time access terminal 100 is manufactured or that is stored at data storage 304 after manufacture of access terminal 100. Default handoff threshold 320 may be identical to a handoff threshold listed in correlation data 316. Alternatively, default handoff threshold 320 may be a handoff threshold that is not listed in correlation data 316. Access terminal 100 may use default threshold 320 when determining whether to hand off to a target pilot signal and the target pilot signal and the current pilot signal are received from base stations in a common subnet or from the same base station.

User interface 306 may include various components to input data from a user of access terminal 100 and/or to output data to the user. As an example, user interface 306 may include a display (e.g., a liquid crystal display) operable to visually present data to the user, a speaker to audibly present data to the user, and an input device to allow the user to input data into access terminal. The input device may, for example, comprise a microphone, a keyboard (e.g., a QWERTY keyboard), buttons, a touch screen, and/or some other device. User interface 306 may provide the input data to processor 300, transceiver 302, and/or data storage 304. The input data may, for example, comprise a dialed phone number, text of a text message (e.g., an SMS message or an e-mail message), a user-selected slot cycle index, an audible voice communications, or some other type of input data. User interface 306 may receive output data from processor 300, transceiver 302, and/or data storage 304. The output data may, for example, comprise a list of slot cycle indices that may be selected by the user, the slot cycle index at which access terminal 100 is operating, text of a text message, audible voice communications, or some other type of output data.

3. Exemplary Operation a. First Exemplary Set of Functions

Figure 6:
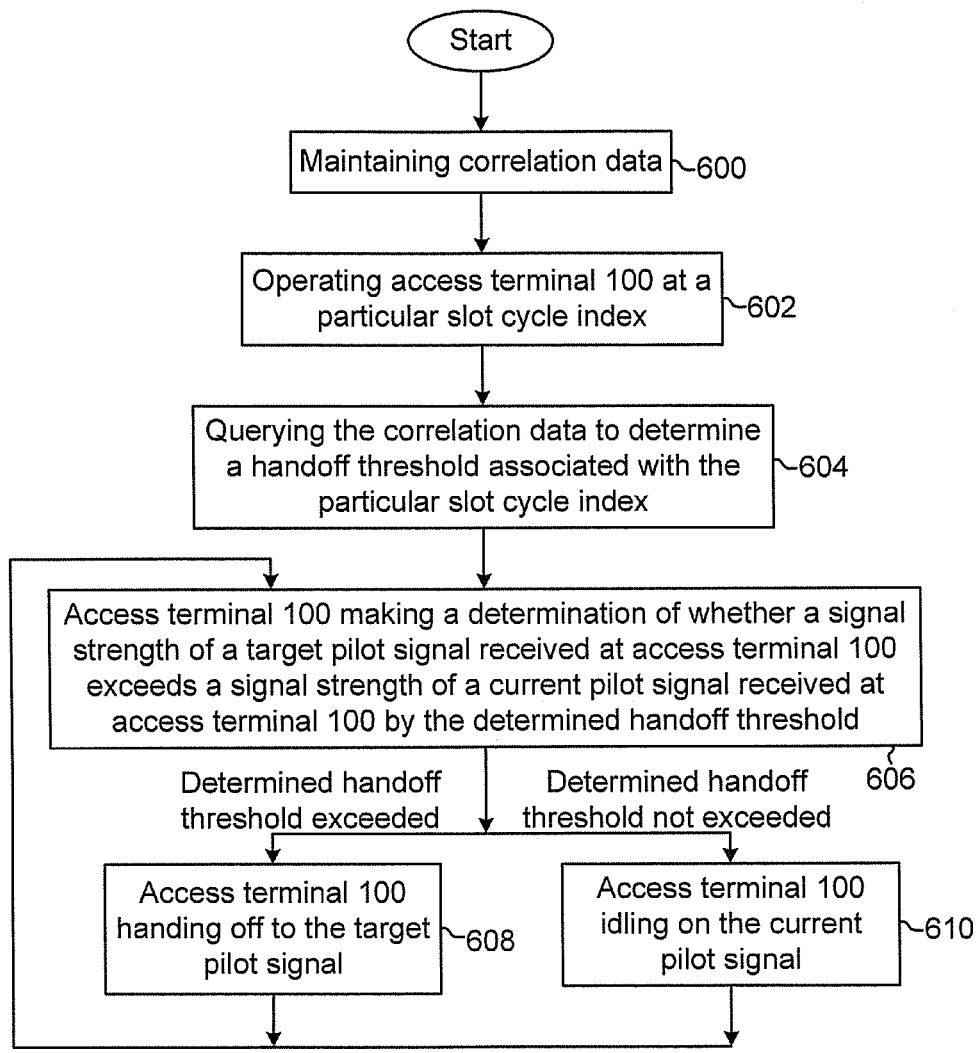
FIG. 6 is a flow chart depicting a set of functions that may be carried out in accordance with an exemplary embodiment of the present invention.

Next, FIG. 6 is a flow chart provided to illustrate a set of functions that may be carried out in accordance with an exemplary embodiment of the present invention. Two or more of the functions shown in the figure may be carried out simultaneously. The functions shown in FIG. 6 may be carried out in an sequence other than a sequence shown in the flow chart.

Block 600 includes maintaining correlation data. The correlation data associates each slot cycle index of a plurality of slot cycle indices with a respective handoff threshold. In this regard, the correlation data may include the slot cycle indices and the handoff thresholds. Access terminal 100 may maintain correlation data (e.g., correlation data 316). Additionally or alternatively, an access network, such as access network 216, may maintain the correlation data. As an example, the correlation data may be maintained by base station 108 and/or RNC 206. The correlation data maintained by the access network may be similar to correlation data 316.

Next, block 602 includes operating access terminal 100 at a particular slot cycle index. Operating access terminal 100 at the particular slot cycle index may include access terminal 100 periodically monitoring one or more forward-link channels (e.g., a paging channel and/or a control channel) of a sector providing service to access terminal 100. For example, if the particular slot cycle index is 8, then access terminal 100 may monitor a paging channel and a control channel of the serving sector every 2.56 seconds. The duration for monitoring the paging channel may, for example, last for one or two slots that are 80 ms each.

Next, block 604 includes querying the correlation data to determine a handoff threshold associated with the particular slot cycle index. In one respect, querying the correlation data may be carried out by access terminal 100. For example, processor 300 may execute program instructions that cause processor 300 to query correlation data 316 to determine the non-default handoff threshold. In another respect, querying the correlation data may be carried out by an access network, such as access network 216. In this regard, access terminal 100 may send to access network 216 data that indicates the particular slot cycle index at which access terminal 100 is operating and a request for access network 216 to query the correlation data. In response to receiving this data and the request, access network 216 may query the correlation data that it maintains so as to determine the non-default threshold and, thereafter, provide access terminal 100 with the non-default handoff threshold.

Next, block 606 includes access terminal 100 making a determination of whether a signal strength of a target pilot signal received at access terminal 100 exceeds a signal strength of a current pilot signal received at access terminal 100 by the determined handoff threshold. Making this determination may include processor 300 executing the first determination instructions. Additionally or alternatively, making this determination may include access terminal 100 measuring the received energy of the target pilot signal, the received energy of the current pilot signal, and the total energy received at receiver 312. Upon making these measurements, access terminal 100 may determine (i) the signal strength of the target pilot signal as a ratio of the received energy of the target pilot signal and the total energy received, and (ii) the signal strength of the current pilot signal as a ratio of the received energy of the current pilot signal and the total received energy. Thereafter, access terminal 100 may determine a difference between the signal strength of the target pilot signal and the signal strength of the current pilot signal and then compare the difference to the determined handoff threshold.

Next, if at block 606, access terminal 100 determines that the signal strength of the target pilot signal exceeds the signal strength of the current pilot signal by the determined handoff threshold, then thereafter the function of block 608 may be carried out. In this regard, access terminal 100 may perform the function of block 608 in response to determining that the signal strength of the target pilot signal exceeds the signal strength of the current pilot signal by the determined handoff threshold.

Block 608 includes access terminal 100 handing off to the target pilot signal. Handing off to the target pilot signal causes access terminal 100 to begin idling on the target pilot signal. In response to the hand off, the target pilot signal becomes the current pilot signal (i.e., a new current pilot signal). The previous current pilot signal may become a target pilot signal for access terminal 100. While idling on the current pilot signal, access terminal 100 may monitor for overhead messages containing the PN code that is also contained in the current pilot signal. Additionally, while idling on the current pilot signal (i.e., the new current pilot signal), access terminal 100 may continue operation at block 606.

On the other hand, if at block 606, access terminal 100 determines that the signal strength of the target pilot signal does not exceed the signal strength of the current pilot signal by the determined handoff threshold, then thereafter the function of block 610 may be carried out. In this regard, access terminal 100 may perform the function of block 610 in response to determining that the signal strength of the target pilot signal does not exceed the signal strength of the current pilot signal by the determined handoff threshold.

Block 610 includes access terminal 100 idling on the current pilot signal. While idling on the current pilot signal, access terminal 100 may monitor for overhead messages containing the PN code that is also contained in the current pilot signal. For example, if the current pilot signal is the pilot signal that includes PN code A, then idling on the current pilot signal may include access terminal 100 monitoring for overhead messages containing PN code A. In accordance with this example, if receiver 312 receives a paging signal that contains PN code A and that indicates an incoming voice call is available for access terminal 100, access terminal 100 may transition from the idle mode to the traffic channel mode so as to carry out the voice call over one or more traffic channels. However, if access terminal 100 continues to idle on the current pilot signal, access terminal 100 may continue operation at block 606.

b. Second Exemplary Set of Functions

Figure 7:
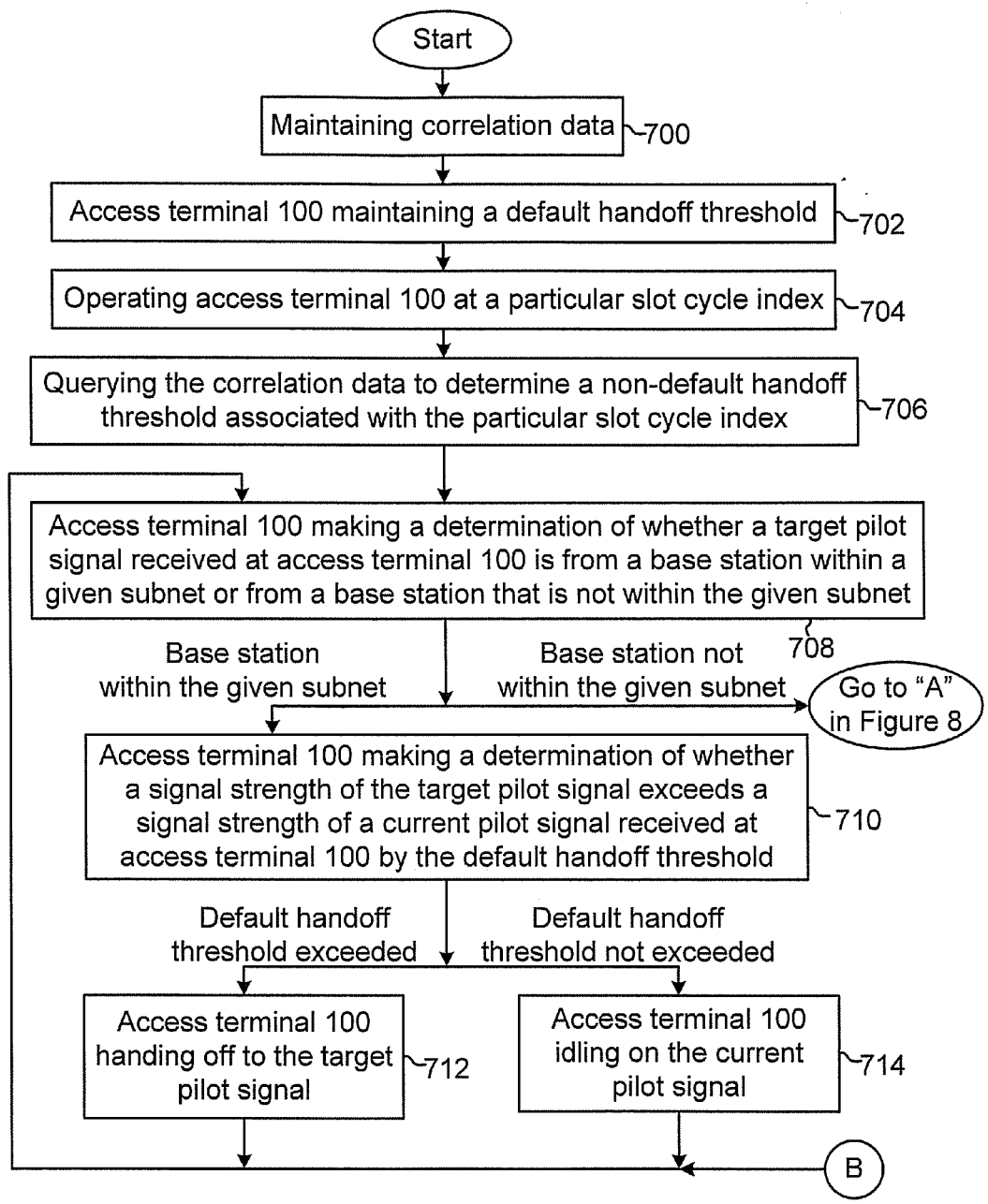
FIGS. 7 and 8 are a flow chart depicting another set of functions that may be carried out in accordance with an exemplary embodiment of the present invention.
Figure 8:
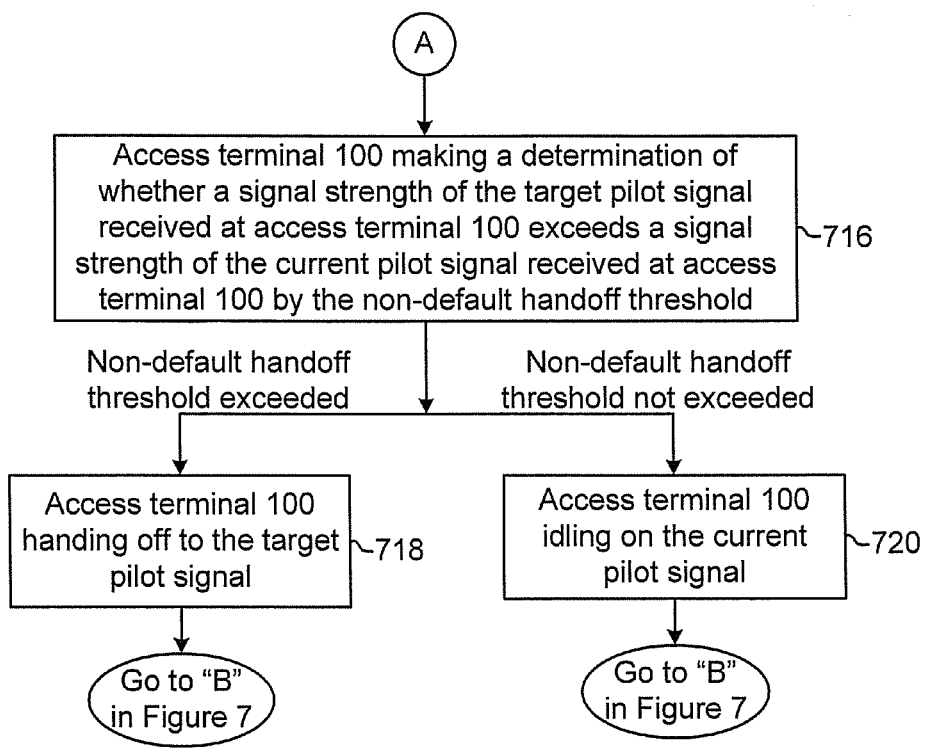

Next, FIGS. 7 and 8 are a flow chart provided to illustrate another set of functions that may be carried out in accordance with an exemplary embodiment. Two or more of the functions shown in the figures may be carried out simultaneously. The functions shown in FIGS. 7 and 8 may occur in a sequence other than the sequence shown in the flow chart.

Block 700 includes maintaining correlation data. The correlation data associates each slot cycle index of a plurality of slot cycle indices with a respective handoff threshold. In this regard, the correlation data may include the slot cycle indices and the handoff thresholds. Access terminal 100 may maintain correlation data (e.g., correlation data 316). Additionally or alternatively, an access network, such as access network 216, may maintain the correlation data. The correlation data maintained by the access network may be similar to correlation data 316.

Next, block 702 includes access terminal 100 maintaining a default handoff threshold. As an example, access terminal 100 may maintain default handoff threshold 320. The default handoff threshold may be stored at data storage 304 at the time data storage 304 and/or access terminal 100 in manufactured, or at some other time.

Next, block 704 includes operating access terminal 100 at a particular slot cycle index. Operating access terminal 100 at the particular slot cycle index may include access terminal 100 periodically monitoring one or more forward-link channels (e.g., a paging channel and/or a control channel) of a sector providing service to access terminal 100. For example, if the particular slot cycle index is 8, then access terminal 100 may monitor a paging channel and a control channel of the serving sector every 2.56 seconds. The duration for monitoring the paging channel may, for example, last for one or two slots that are 80 ms each.

Next, block 706 includes querying the correlation data to determine a non-default handoff threshold associated with the particular slot cycle index. In one respect, querying the correlation data may be carried out by access terminal 100. For example, processor 300 may execute program instructions that cause processor 300 to query correlation data 316 to determine the non-default handoff threshold. In another respect, querying the correlation data may be carried out by an access network, such as access network 216. In this regard, access terminal 100 may send to access network 216 data that indicates the particular slot cycle index at which access terminal 100 is operating and a request for access network 216 to query the correlation data. In response to receiving this data and the request, access network 216 may query the correlation data maintained by the access network 216 so as to determine the non-default threshold and, thereafter, provide access terminal 100 with the non-default handoff threshold.

Next, block 708 includes access terminal 100 making a determination of whether a target pilot signal received at access terminal 100 is from a base station within a given subnet (e.g., subnet 202) or from a base station that is not within the given subnet. The given subnet is a subnet that includes a base station that transmits the current pilot signal to access terminal 100. To make the determination, access terminal 100 may determine the PN code contained in the target pilot signal and query neighbor list 318 so as to determine the neighbor subnet parameter associated with the PN code contained in the target pilot signal. As an example, access terminal 100 may determine that the target pilot signal includes the PN code B and query neighbor list 318 so as to determine that the neighbor subnet parameter associated with PN code B is a 0. Access terminal 100 can use the determined neighbor subnet parameter as a basis to determine whether or not the target pilot signal is received from a base station within the given subnet. As an example, processor 300 may execute the second determination instructions, described above, so as to make the determination of block 708.

A person having ordinary skill in the art will understand that block 708 may be carried out simultaneously or substantially simultaneously for multiple target pilot signals. For instance, if access terminal 100 receives three pilot signals (e.g., the current pilot signal and two target pilot signals), access terminal 100 may make the determination of block 708 for each of the received target pilot signals. For the functions of block 708, substantially simultaneously refers to making the multiple determinations sequentially with no delay or minimal delay (e.g., less than 10 msec) between each determination.

If, at block 708, access terminal 100 determines that the base station is within the given subnet, then thereafter the function of block 710 may be carried out. Block 710 includes access terminal 100 making a determination of whether a signal strength of the target pilot signal exceeds a signal strength of a current pilot signal received at access terminal 100 by the default handoff threshold. Making this determination may include processor 300 executing the third determination instructions. Additionally or alternatively, making the determination of block 710 may include access terminal 100 measuring the received energy of the target pilot signal, the received energy of the current pilot signal, and the total energy received at receiver 312. Upon making these measurements, access terminal 100 may determine (i) the signal strength of the target pilot signal as a ratio of the received energy of the target pilot signal and the total energy received, and (ii) the signal strength of the current pilot signal as a ratio of the received energy of the current pilot signal and the total received energy. Thereafter, access terminal 100 may determine a difference between the signal strength of the target pilot signal and the signal strength of the current pilot signal and then compare the difference to the default handoff threshold.

If, at block 710, access terminal 100 determines that the signal strength of the target pilot signal exceeds the signal strength of the current pilot signal by the default handoff threshold, then thereafter the function of block 712 may be carried out. In this regard, access terminal 100 may perform the function of block 712 in response to determining that the signal strength of the target pilot signal exceeds the signal strength of the current pilot signal by the default handoff threshold.

Block 712 includes access terminal 100 handing off to the target pilot signal. Handing off to the target pilot signal causes access terminal 100 to begin idling on the target pilot signal. In response to the handoff, the target pilot signal becomes the current pilot signal (i.e., a new current pilot signal). The previous current pilot signal may become a target pilot signal for access terminal 100. While idling on the current pilot signal, access terminal 100 may monitor for overhead messages containing the PN code that is also contained in the current pilot signal. Additionally, while idling on the current pilot signal (i.e., the new current pilot signal), access terminal 100 may continue operation at block 708.

If, at block 710, access terminal 100 determines that the signal strength of the target pilot signal does not exceed the signal strength of the current pilot signal by the default handoff threshold, then thereafter the function of block 714 may be carried out. In this regard, access terminal 100 may perform the function of block 714 in response to determining that the signal strength of the target pilot signal does not exceed the signal strength of the current pilot signal by the default handoff threshold.

Block 714 includes access terminal 100 idling on the current pilot signal. While idling on the current pilot signal, access terminal 100 may monitor for overhead messages containing the PN code that is also contained in the current pilot signal. Additionally, while idling on the current pilot signal, access terminal 100 may continue operation at block 708.

Returning to block 708, if access terminal 100 determines that the base station is not within the given subnet, then thereafter the function of block 716 may be carried out. Block 716 is shown in FIG. 8 and includes access terminal 100 making a determination of whether a signal strength of the target pilot signal received at access terminal 100 exceeds a signal strength of the current pilot signal received at the access terminal 100 by the non-default handoff threshold. Making the determination of block 716 may include access terminal 100 measuring the received energy of the target pilot signal, the received energy of the current pilot signal, and the total energy received at receiver 312. Upon making these measurements, access terminal 100 may determine (i) the signal strength of the target pilot signal as a ratio of the received energy of the target pilot signal and the total energy received, and (ii) the signal strength of the current pilot signal as a ratio of the received energy of the current pilot signal and the total received energy. Thereafter, access terminal 100 may determine a difference between the signal strength of the target pilot signal and the signal strength of the current pilot signal and then compare the difference to the non-default handoff threshold.

Next, if at block 716, access terminal 100 determines that the signal strength of the target pilot signal exceeds the signal strength of the current pilot signal by the non-default handoff threshold, then thereafter the function of block 718 may be carried out. In this regard, access terminal 100 may perform the function of block 718 in response to determining that the signal strength of the target pilot signal exceeds the signal strength of the current pilot signal by the non-default handoff threshold.

Block 718 includes access terminal 100 handing off to the target pilot signal. Handing off to the target pilot signal causes access terminal 100 to begin idling on the target pilot signal. In response to the handoff, the target pilot signal becomes the current pilot signal (i.e., a new current pilot signal). The previous current pilot signal may become a target pilot signal for access terminal 100. While idling on the current pilot signal, access terminal 100 may monitor for overhead messages containing the PN code that is also contained in the current pilot signal. Additionally, while idling on the current pilot signal (i.e., the new current pilot signal), access terminal 100 may continue operation at block 708.

On the other hand, if at block 716, access terminal 100 determines that the signal strength of the target pilot signal does not exceed the signal strength of the current pilot signal by the non-default handoff threshold, then thereafter the function of block 720 may be carried out. In this regard, access terminal 100 may perform the function of block 720 in response to determining that the signal strength of the target pilot signal does not exceed the signal strength of the current pilot signal by the default handoff threshold.

Block 720 includes access terminal 100 idling on the current pilot signal. While idling on the current pilot signal, access terminal 100 may monitor for overhead messages containing the PN code that is also contained in the current pilot signal. Additionally, while idling on the current pilot signal, access terminal 100 may continue operation at block 708.

4. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:
1. A method comprising:
storing, within a data storage device, correlation data that comprises (i) a plurality of slot cycle indices including at least a first slot cycle index and a second slot cycle index that differs from the first slot cycle index, and (ii) a plurality of handoff thresholds including at least a first handoff threshold and a second handoff threshold that differs from the first handoff threshold, wherein the correlation data associates each slot cycle index of the plurality of slot cycle indices with a handoff threshold of the plurality of handoff thresholds, and wherein the first slot cycle index is associated with the first handoff threshold that differs from the second handoff threshold and the second slot cycle index is associated with the second handoff threshold that differs from the first handoff threshold;
an access terminal operating at a particular slot cycle index of the plurality of slot cycle indices, wherein the access terminal uses the particular slot cycle index to determine how often to monitor overhead messages from a base station serving the access terminal;
querying the correlation data to determine, from among the plurality of handoff thresholds, a handoff threshold associated with the particular slot cycle index;
the access terminal making a first determination of whether a signal strength of a target pilot signal received at the access terminal exceeds a signal strength of a current pilot signal received at the access terminal by the determined handoff threshold associated with the particular slot cycle index the access terminal uses to determine how often to monitor overhead messages from the base station serving the access terminal;
if the access terminal determines that the signal strength of the target pilot signal exceeds the signal strength of the current pilot signal by the determined handoff threshold, the access terminal thereafter handing off to the target pilot signal, and
if the access terminal determines that the signal strength of the target pilot signal does not exceed the signal strength of the current pilot signal by the determined handoff threshold, then the access terminal thereafter idling on the current pilot signal.
2. The method of claim 1,
wherein the current pilot signal is received from a given base station within a first subnet, and
wherein the access terminal making the first determination is conditioned on whether the target pilot signal is received from a base station within the first subnet or from a base station that is not within the first subnet,
the method further comprising:
the access terminal maintaining a default handoff threshold;
the access terminal making a second determination of whether the target pilot signal is received from a base station within the first subnet or from a base station that is not within the first subnet;
if the access terminal determines that target pilot signal is received from a base station within the first subnet, the access terminal thereafter making a third determination of whether the signal strength of the target pilot signal exceeds the signal strength of the current pilot signal by the default handoff threshold,
if the access terminal determines that the signal strength of the target pilot signal exceeds the signal strength of the current pilot signal by the default handoff threshold, the access terminal thereafter handing off to the target pilot signal, if the access terminal determines that the signal strength of the target pilot signal does not exceed the signal strength of the current pilot signal by the default handoff threshold, then the access terminal thereafter idling on the current pilot signal, and if the access terminal determines that target pilot signal is received from a base station that is not within the first subnet, the access terminal thereafter making the first determination.

3. The method of claim 2, further comprising:

the access terminal receiving a neighbor list from the given base station, wherein the current pilot signal is transmitted from a given sector of the given base station, wherein the neighbor list contains (i) a list of PN codes, each of the listed PN codes being associated with a respective sector neighboring the given sector, and (ii) for each of the listed PN codes, a parameter that indicates whether the neighboring sector associated with that PN code is a sector that transmits a target pilot signal from a base station within the first subnet or from a base station that is not within the first subnet, wherein the received target pilot signal is transmitted from a neighboring sector associated with a listed PN code and contains one of the listed PN codes, and wherein making the second determination includes the access terminal querying the received neighbor list so as to determine the parameter associated with the PN code contained in the received target pilot signal.

4. The method of claim 2, wherein the first subnet comprises a first logical set of base stations, the first logical set of base stations including the given base station, wherein the base station that is not within the first subnet is a base station within a second subnet, and wherein the second subnet comprises a second logical set of base stations.

5. The method of claim 1, wherein storing the correlation data and querying the correlation data are performed by the access terminal.

6. The method of claim 1, wherein the correlation data is stored by an access network that serves the access terminal, the method further comprising:

the access network determining that the access terminal is operating at the particular slot cycle index, wherein querying the correlation data to determine the handoff threshold associated with the particular slot cycle index is carried out by the access network after determining that the access terminal is operating at the particular slot cycle index; and thereafter, the access network providing the access terminal with data that indicates the determined handoff threshold.

7. The method of claim 1, wherein the current pilot signal contains a first PN code, wherein the target pilot signal contains a second PN code, wherein idling on the current pilot signal includes the access terminal monitoring overhead messages containing the first PN code, and wherein, after handing off to the target pilot signal, the access terminal monitors overhead messages containing the second PN code.

8. The method of claim 1, wherein the signal strength of the target pilot signal is represented as a ratio of received energy of the target pilot signal and a total received energy, and wherein the signal strength of the current pilot signal is represented as a ratio of received energy of the current pilot signal and the total received energy.

9. The method of claim 1, the method further comprising:

after the access terminal hands off to the target pilot signal, the access terminal idling on the target pilot signal.

10. An access terminal comprising:

a processor;

a receiver to receive a current pilot signal and a target pilot signal; and a data storage device storing computer-readable program instructions that are executable by the processor and correlation data that comprises (i) a plurality of slot cycle indices including at least a first slot cycle index and a second slot cycle index that differs from the first slot cycle index, and (ii) a plurality of handoff thresholds including at least a first handoff threshold and a second handoff threshold that differs from the first handoff threshold, wherein the correlation data associates each slot cycle index of the plurality of slot cycle indices with a handoff threshold of the plurality of handoff thresholds, and wherein the first slot cycle index is associated with the first handoff threshold that differs from the second handoff threshold and the second slot cycle index is associated with the second handoff threshold that differs from the first handoff threshold;

wherein the computer-readable program instructions include instructions that (i) cause the access terminal to operate at a particular slot cycle index of the plurality of slot cycle indices, wherein the access terminal uses the particular slot cycle index to determine how often to monitor overhead messages from a base station serving the access terminal, (ii) cause the access terminal to query the correlation data to determine, from among the plurality of handoff thresholds, a handoff threshold associated with the particular slot cycle index, and (iii) cause the access terminal to make a first determination of whether a signal strength of the target pilot signal exceeds a signal strength of the current pilot signal by the determined handoff threshold associated with the particular slot cycle index the access terminal uses to determine how often to monitor overhead messages from the base station serving the access terminal, wherein if the access terminal determines that the signal strength of the target pilot signal exceeds the signal strength of the current pilot signal by the determined handoff threshold, the access terminal thereafter hands off to the target pilot signal, and wherein if the access terminal determines that the signal strength of the target pilot signal does not exceed the signal strength of the current pilot signal by the determined handoff threshold, the access terminal thereafter idles on the current pilot signal.

11. The access terminal of claim 10, wherein the current pilot signal is received from a given base station within a first subnet, wherein the data storage device further stores (i) a default handoff threshold, (ii) program instructions that cause the access terminal to make a second determination of whether the target pilot signal is received from a base station within the first subnet or from a base station that is not within the first subnet, and (iii) program instructions that cause the access terminal to make a third determination of whether the signal strength of the target pilot signal exceeds the signal strength of the current pilot signal by the default handoff threshold, wherein execution of the program instructions that cause the access terminal to make the first determination is conditioned on whether the target pilot signal is received from a base station within the first subnet or from a base station that is not within the first subnet, wherein if the access terminal determines that the target pilot signal is received from a base station that is within the first subnet, the processor responsively executes the program instructions that cause the access terminal to make the third determination, wherein if the access terminal determines that the signal strength of the target pilot signal exceeds the signal strength of the current pilot signal by the default handoff threshold, the access terminal thereafter hands off to the target pilot signal, wherein if the access terminal determines that the signal strength of the target pilot signal does not exceed the signal strength of the current pilot signal by the default handoff threshold, then the access terminal thereafter idles on the current pilot signal, and wherein if the access terminal determines that the target pilot signal is received from a base station that is not within the first subnet, the processor responsively executes the program instructions that cause the access terminal to make the first determination.

12. The access terminal of claim 11,
wherein the receiver receives a neighbor list from the given base station,
wherein the data storage device thereafter stores the received neighbor list,
wherein the current pilot signal is received from a given sector of the given base station,
wherein the neighbor list contains (i) a list of PN codes, each of the listed PN codes being associated with a respective sector neighboring the given sector, and (ii) for each of the listed PN codes, a parameter that indicates whether the neighboring sector associated with that PN code is a sector that transmits a target pilot signal from a base station within the first subnet or from a base station that is not within the first subnet,
wherein the received target pilot signal is transmitted from a neighboring sector associated with a listed PN code and contains one of the listed PN codes, and
wherein the program instructions that cause the processor to make the second determination include instructions that cause the access terminal to query the neighbor list maintained in the data storage device so as to determine the parameter associated with the PN code contained in the received target pilot signal.

13. The access terminal of claim 11,
wherein the first subnet comprises a first logical set of base stations, the first logical set of base stations including the given base station,
wherein the base station that is not within the first subnet is a base station within a second subnet, and
wherein the second subnet comprises a second logical set of base stations.

14. The access terminal of claim 10,
wherein the current pilot signal contains a first PN code,
wherein the target pilot signal contains a second PN code,
wherein, while the access terminal idles on the current pilot signal, the access terminal monitors overhead messages containing the first PN code, and wherein, after the access terminal hands off to the target pilot signal, the access terminal monitors overhead messages containing the second PN code.

15. The access terminal of claim 10,
wherein the signal strength of the target pilot signal is represented as a ratio of received energy of the target pilot signal and a total received energy, and
wherein the signal strength of the current pilot signal is represented as a ratio of received energy of the current pilot signal and the total received energy.

16. A method comprising:
storing, within a data storage device of an access terminal, correlation data that comprises (i) a plurality of slot cycle indices including at least a first slot cycle index and a second slot cycle index that differs from the first slot cycle index, and (ii) a plurality of handoff thresholds including at least a first handoff threshold and a second handoff threshold that differs from the first handoff threshold, wherein the correlation data associates each slot cycle index of the plurality of slot cycle indices with a handoff threshold of the plurality of handoff thresholds, and wherein the first slot cycle index is associated with the first handoff threshold that differs from the second handoff threshold and the second slot cycle index is associated with the second handoff threshold that differs from the first handoff threshold;
the access terminal operating at a particular slot cycle index of the plurality of slot cycle indices, wherein the access terminal uses the particular slot cycle index to determine how often to monitor overhead messages from a base station serving the access terminal;
the access terminal querying the correlation data to determine, from among the plurality of handoff thresholds, a handoff threshold associated with the particular slot cycle index;
the access terminal making a first determination of whether a signal strength of a target pilot signal received at the access terminal exceeds a signal strength of a current pilot signal received at the access terminal by the determined handoff threshold associated with the particular slot cycle index the access terminal uses to determine how often to monitor overhead messages from the base station serving the access terminal;
if the access terminal determines that the signal strength of the target pilot signal exceeds the signal strength of the current pilot signal by the determined handoff threshold, the access terminal thereafter handing off to the target pilot signal, and
if the access terminal determines that the signal strength of the target pilot signal does not exceed the signal strength of the current pilot signal by the determined handoff threshold, then the access terminal thereafter idling on the current pilot signal.

17. The method of claim 16,
wherein the current pilot signal is received from a given base station within a first subnet, and
wherein the access terminal making the first determination is conditioned on whether the target pilot signal is received from a base station within the first subnet or from a base station that is not within the first subnet,
the method further comprising:
the access terminal maintaining a default handoff threshold;
the access terminal making a second determination of whether the target pilot signal is received from a base station within the first subnet or from a base station that is not within the first subnet;

if the access terminal determines that target pilot signal is received from a base station within the first subnet, the access terminal thereafter making a third determination of whether the signal strength of the target pilot signal exceeds the signal strength of the current pilot signal by the default handoff threshold, if the access terminal determines that the signal strength of the target pilot signal exceeds the signal strength of the current pilot signal by the default handoff threshold, the access terminal thereafter handing off to the target pilot signal, if the access terminal determines that the signal strength of the target pilot signal does not exceed the signal strength of the current pilot signal by the default handoff threshold, then the access terminal thereafter idling on the current pilot signal, and if the access terminal determines that target pilot signal is received from a base station that is not within the first subnet, the access terminal thereafter making the first determination.

18. The method of claim 17,
wherein the first subnet comprises a single radio network controller and a logical set of base stations, the logical set of base stations including the given base station, and
wherein each base station of the logical set of base stations is controlled by the radio network controller.

19. The method of claim 17,
wherein the first subnet comprises multiple radio network controllers and a logical set of base stations, the logical set of base stations including the given base station, and
wherein each of the radio network controllers controls at least one base station of the logical set of base stations.

20. The method of claim 16, further comprising:
prior to storing the correlation data within the data storage device, receiving the correlation data at the access terminal from a wireless access network.

21. The method of claim 1, wherein the particular slot cycle index is one of the first slot cycle index and the second slot cycle index.

22. The method of claim 21, wherein the particular slot cycle index is a user-selected slot cycle index.

* * * * *